United States Patent [19]
Krogh et al.

[11] Patent Number: 5,730,791
[45] Date of Patent: Mar. 24, 1998

[54] ASPHALT-BASE COATING COMPOSITION WITH NOVEL HINDERED ACID/AMINE SALT SURFACTANT

[75] Inventors: James A. Krogh, Janesville; Michael R. Sipe, Milton, both of Wis.

[73] Assignee: Tomah Products, Inc., Milton, Wis.

[21] Appl. No.: 805,495

[22] Filed: Feb. 26, 1997

[51] Int. Cl.$^6$ .................................................. C09D 195/00
[52] U.S. Cl. .................................. 106/284.06; 106/284.4
[58] Field of Search ........................... 106/284.06, 284.4

[56] References Cited

U.S. PATENT DOCUMENTS

| | | | |
|---|---|---|---|
| 3,347,690 | 10/1967 | Galvin | 106/273.1 |
| 4,759,799 | 7/1988 | Vicenzi | 106/284.06 |
| 5,362,314 | 11/1994 | Vicenzi et al. | 106/284.4 |
| 5,362,690 | 11/1994 | Vicenzi et al. | 106/284.4 |
| 5,529,621 | 6/1996 | Hudson et al. | 106/278 |
| 5,618,340 | 4/1997 | Krogh et al. | 106/284.06 |
| 5,622,554 | 4/1997 | Krogh et al. | 106/284.06 |

OTHER PUBLICATIONS

Product brochure from Surface Chemists of Florida, Inc. describing SURTECH AS–109 additive for asphalt compositions no date.
Product brochure from Chemax, Inc. describing MAXCOTE®RC–2015 additive for roof coating compositions no date.
Product brochure from Akzo Chemie describing Redicote CG roof coating composition no date.

*Primary Examiner*—Anthony Green
*Attorney, Agent, or Firm*—Jansson, Shupe, Bridge & Munger, LTD.

[57] ABSTRACT

An improved asphalt roof-coating composition which includes asphalt, clay, and a novel hindered acid/amine salt surfactant. The surfactant comprises an acid constituent which has at least two alkyl groups bonded to the alpha carbon and an amine constituent comprising a variety of primary, secondary and tertiary amines. The composition has excellent physical properties including good viscosity and gel stability.

19 Claims, No Drawings

ASPHALT-BASE COATING COMPOSITION WITH NOVEL HINDERED ACID/AMINE SALT SURFACTANT

FIELD OF THE INVENTION

This invention is related generally to coating compositions and, more particularly, to asphalt-based roof coatings for leak prevention and the like.

BACKGROUND OF THE INVENTION

Asphalt-based roof coatings having thick, highly-viscous characteristics have been used for many years to seal joints between roof membranes, join flashings to parapet walls and otherwise repair, seal and protect roof surfaces from exposure to the environment. These roof coating products are typically available in one to five gallon pails for use by homeowners or are available in bulk for use by professional roofing contractors.

Prior art asphalt-based roof coatings typically include asphalt, clay and a surfactant. The asphalt is used as a binder and the clay thickens the composition and provides gelling properties. The surfactant is present to produce optimum wetting and dispersion by reducing the interfacial tension between the asphalt and clay. Additives known as fillers may be included to provide bulk and other properties to the roof coating composition. These asphalt-based coating compositions are an improvement over earlier compositions which include asbestos. The asbestos is added to the composition to provide texture, strength and thixotropic properties to the formulation.

A roof coating composition which is effective for its purpose must have certain characteristics, most of which are a function of the surfactant selected for use in such composition. The roof coating composition must be relatively inexpensive to manufacture (so that it can be competitively priced) because the roof coating industry is intensely competitive. As those experienced in the art are aware, small price differences per unit volume have a significant effect on product sales and can mean the difference between success or failure in the marketplace. The high cost of the surfactant, in particular, makes certain prior art roof coating compositions expensive and places such products at a disadvantage in the marketplace.

The roof coating composition must have the appropriate physical characteristics to properly seal a wide range of roof surfaces and resist degradation when exposed to extreme environmental conditions. The composition must be highly viscous to adequately coat and seal the roof surface and to stay in place at the point of application. Viscosity, of course, refers to the thickness of the composition. Increased viscosity is desirable and indicates that the clay and asphalt constituents are well-dispersed, thereby assuring optimal performance of the composition. In addition to suitable viscosity, the composition should have superior gel stability meaning that the viscosity remains constant between manufacture and application to the roof surface.

While the composition must be viscous and have good gel stability, it should also be easy to manufacture and formulate. The most desired surfactants should be liquid (not solid) so that they can be handled easily and readily mixed with the asphalt and clay without having to apply heat or extraordinary mixing equipment.

The surfactant of the roof coating composition must be robust and capable of dispersing other ingredients and imparting appropriate viscosity to compositions including a wide range of asphalt and clays. Asphalt, in particular, lack uniformity and vary greatly in constituents. Also, as is well known in the roof coating manufacturing industry, asphalt may be oxidized or unoxidized, depending upon the practice of the asphalt manufacturer. Oxidization of the asphalt can greatly affect its characteristics. Inability of the surfactant to disperse a wide range of constituents will result in loss of viscosity and cause premature failure of the composition.

But those are not the only characteristics of a preferred roof coating. Relative freedom from odor, especially offensive odor, and compatibility with composition containers and metal surfaces are others. Freedom from corrosivity may be particularly important if the composition is used for other applications such as automobile undercoatings.

One example of a very-effective prior art asphalt-based roof coating composition is disclosed in U.S. Pat. No. 4,759,799 (Vicenzi). The roof-coating composition of the Vicenzi patent includes asphalt, clay and a surfactant. The surfactant of Vicenzi is an alkyloxyalkylamine salt, preferably, decyloxypropylamine acetate which is sold by Tomah Products, inc. of Milton, Wis. under the tradename PA-14 Acetate. Roof coating compositions using the PA-14 acetate surfactant have excellent performance and handling characteristics and are robust. Their premium price reflects the cost of the surfactant.

Other asphalt-based coating compositions are disclosed in co-pending U.S. patent applications Ser. Nos. 08/684,126 and 08/684,129. The '126 application is directed to a coating having asphalt, clay and a surfactant as primary constituents. The novel salt surfactant of the composition includes certain alkoxylated tertiary amines which impart favorable physical properties to the coating.

The '129 application is also directed to a coating having asphalt, clay and a surfactant as primary constituents. The salt surfactant of the '129 application is a novel ether amine-acid-complex which imparts favorable properties at a competitive price.

Yet another prior art roof coating composition is Redicote CG manufactured by Akzo Chemie of Chicago, Ill. Redicote CG is an asphalt-based roof coating composition and has the disadvantage of having an odor which some consider to be offensive. The odor issue is a particular problem during manufacture of the Redicote CG.

An inexpensive roof coating composition with improved viscosity and gel stability, which is easy to manufacture and apply, which is robust and capable of being used with a wide variety of asphalts and clays and which avoids the disadvantages of prior art roof coating compositions would represent a significant advance in the art.

OBJECTS OF THE INVENTION

It is an object of this invention to provide an improved roof coating composition and surfactant for use in such composition overcoming problems and shortcomings of the prior art.

Another object of this invention is to provide an improved roof coating composition which is relatively inexpensive.

A further object of this invention is to provide a roof coating composition with improved viscosity and gel stability.

Yet another object of this invention is to provide an improved roof coating composition which is easy to manufacture and apply.

An important object of the invention is to provide an improved roof coating composition which is robust and capable of being used with a wide variety of asphalts and clays.

It is also an object of this invention to provide an improved roof coating composition which is substantially free of odors which some may consider to be offensive.

Another object of this invention is to provide an improved roof coating composition which exhibits a reduced tendency toward flammability, particularly during blending.

An additional object of this invention is to provide an improved roof coating composition which, in certain embodiments, shows improved corrosion protection for metal surfaces such as metal storage containers and automobile underbodies.

How these and other objects are accomplished will be apparent from the descriptions of this invention which follow.

SUMMARY OF THE INVENTION

The invention is an improved asphalt roof-coating composition including asphalt cutback, clay and a novel surfactant composition. The roof coating composition includes about 80-95 parts by weight of a roof-coating asphalt cutback, about 5-20 parts by weight of clay, and a salt surfactant comprising an amine and a hindered acid. The acid constituent of the surfactant preferably has the general structural formula:

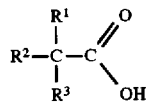

wherein $R^1$ comprises H, $CH_3$; $R^2$ comprises $C_1-C_{11}$; $R^3$ comprises $C_1-C_{11}$; and the total number of carbon atoms in each acid molecule is between 5 and 14.

The amine constituent of the surfactant preferably has the general structural formula:

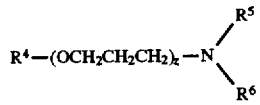

wherein $R^4$ comprises $C_6-C_{20}$; -z is a numeric value selected from the group of numeric values consisting of: 0 and 1; $R^5$ comprises H, $CH_3$ and from 1 to 15 moles of alkylene oxide units, such units being selected from the group consisting of: ethyleneoxy, propyleneoxy, butyleneoxy And mixtures thereof; and $R^6$ comprises H, $CH_3$, $R^4$—$(OCH_2CH_2CH_2)_z$—, —$CH_2CH_2CH_2NH_2$ and $C_6-C_{20}$.

The term "comprising" is used in the claims and in this specification to emphasize that a wide range of isolated and mixed acids and amines are suitable for use in the invention. The carboxylic acids of the invention are hindered and include at least two alkyl groups bonded to the alpha carbon. The total number of carbon atoms in each acid molecule should be from 5 to 14. Description of carbon atom chains in the acids (and amines) by terms such as $C_1-C_{11}$ or $C_6-C_{20}$ is intended to signify that the chains may have varying conformations including straight, branched and cyclic and may include varying degrees of saturation. Neo acids are most highly preferred.

Preferred acids for use in the novel surfactant are selected from the group consisting of: 2-Methylbutanoic acid, neopentanoic acid, 2-Methylhexanoic acid, neoheptanoic acid, isooctanoic acid, neooctanoic acid, isononanoic acid, neononanoic acid, isodecanoic acid, neodecanoic acid, neotridecanoic acid and mixtures thereof. Neopentanoic acid is most highly preferred.

Many amines are suitable for use in the inventive surfactant. These amines include primary, secondary and tertiary amines. Diamines and alkoxylated amines may be used. Mixtures of the amines may be used.

The preferred primary amines of the invention may include fatty amines (e.g., when z=0), ether amines (e.g., when z=1) and mixtures of fatty and ether amines. The preferred fatty amines have between 6 to 20 carbon atoms in the group identified as $R^4$ and may include varying degrees of unsaturation. The preferred ether amines of the invention also have between 6 to 20 carbon atoms in the group identified as $R^4$ and also may include varying degrees of saturation.

These primary amines and hindered acids are desirable because of their physical properties and commercial availability. The hindered acid is an important aspect of this invention because the alkyl groups impart liquidity to the surfactant. Liquid surfactants, such as those of the invention, are superior because they are easy to admix and handle. Such liquid surfactants avoid fire hazards associated with flammable solvents used to liquify solid surfactants. There is no particular requirement with respect to the molar ratios of the acid and amine constituents. Such ratios need not be equimolar.

Primary amines are most highly preferred for the amine constituent of the inventive surfactant. Preferred fatty primary amines are selected from the group consisting of coco amine and tallow amine each of which, of course, consist of a blend of fatty amines. Highly preferred fatty amines are selected from the group consisting of: hexylamine, octylamine, decylamine, dodecylamine, tetradecylamine, oleylamine, sterylamine, linoleylamine, linolenylamine, palmityleylamine, palmitylamine and mixtures thereof.

Useful alkyloxypropylamines are selected from the group consisting of: octyloxypropylamine, decyloxypropylamine, dodecyloxypropylamine and mixtures thereof. Decyloxypropylamine is a most highly preferred alkyloxypropylamine.

The carboxylic acids described above may be used with the foregoing primary amines to prepare variants of the inventive surfactant. A most highly preferred form of the surfactant comprises decyloxypropylamine and neopentanoic acid.

The asphalt cutback is the predominant component of the composition and the amount of such asphalt cutback does not vary greatly with respect to the amount of clay and surfactant of such composition. The asphalt cutbacks best suited for this invention may be medium-cure (MC) cutbacks, rapid-cure (RC) cutbacks, or even slow-cure (SC) cutbacks. The asphalt may be oxidized or unoxidized.

In preferred embodiments of this invention, attapulgite clays are used. Such clays, which have been widely used in the non-asbestos systems of the prior art, are principally mined by Engelhard Corporation and the Floridin Company. The attapulgite clays are specially-sized and processed gelling clay products suitable for thickening asphalt-based coatings. Depending on the asphalt cutback used and other factors, the optimal ratio of clay to surfactant (known as the "C/S ratio") is preferably from about 8:1 to about 12:1 in formulations having about 8 to 12% clay. Formulations in which the ratio of clay to surfactant is at least about 10:1 are particularly preferred because they provide good performance yet reduce cost.

Additional ingredients known as "fillers" may be included to provide bulk and impart other characteristics to the composition. Preferred fillers include sand, mica, ground slate, diatomaceous earth, ground limestone, wollastonite, pearlite, cellulosic fibers, talc, and polyolefin fibers.

The excellent performance and physical properties of the roof coating compositions of the invention were unexpected. It was believed that highly hindered acids would be unsatisfactory as constituents of a surfactant because the alkyl groups would impair reactivity of the acid and the amine thereby reducing the liquidity of the surfactant. This presented a problem because some of the amine constituents of the invention are solid or semi-solid at room temperature. In fact, the inventive surfactants have excellent liquidity and surfactancy.

While not wanting to be bound by theoretical considerations, it may be that the alkyl groups of the acid cause the amine molecules to be oriented in irregular conformations thereby enhancing liquidity of the surfactant. The alkyl groups of the acid constituent may also enhance surfactancy because of their ability to bond with, and disperse, the hydrophobic asphalt constituent of the roof coating composition.

Examples of suitable asphalt cutbacks for use in this invention are: Exxon 7057, an MC cutback available from Exxon Corporation, Houston, Tex.; Gardner cutback, an MC cutback available from Gardner Asphalt Company, Tampa, Fla.; Trumbull 6009 (oxidized) and 6032 (unoxidized), available from Trumbull Asphalt, Summit, Ill.; and the asphalt cutback from Seaboard Asphalt Products Company, Baltimore, Md. Suitable asphalt cutbacks are available from many other sources.

Examples of suitable clays include: Min-U-Gel AR, an attapulgite available from Floridin Company, Berkeley Springs, W.V., and attapulgites known as ATTAGEL 36, 40, 50 and 2059, available from Engelhard Corporation, Edison, N.J. Such clays are available commercially in different particle sizes. Other clays may be used, but the attapulgites are highly preferred.

Suitable acid precursors for use in the surfactant are readily available from commercial sources. These include, without limitation, Neo 910 (blend of C9 and C10 acids), Neo 913 (blend of C9 and C13 acids), Neo 919 (blend of C5, C9 and C10 acids) and Neo 928 (blend of C5, C7, C9 and C10 acids) neo acids sold by Exxon Chemical Company, Intermediates Division, Houston, Tex. Exxon Chemical Company is also a source of branched acids including isooctanoic, isononanoic and isotridecanoic acids.

Suitable secondary and tertiary amine precursors are available from a number of commercial sources. For example, suitable tertiary amines include dimethyl cocoamine (Kemamine T-6502D) from the Humko Division, of Witco Corporation, Memphis, Tenn. Alkyl dimethyl amines (referred to by the tradename ADMA) are available from the Ethyl Corporation, Baton Rouge, La.

A representative source of secondary amines is BASF Corporation, of Mount Olive, N.J., which manufactures Di-(2-ethylhexyl) amine.

Primary fatty amines useful in the invention are available from a variety of sources. Akzo-Nobel Chemicals, Inc. of Chicago, Ill. and Witco Corporation, Oleo/surfactants Group of Greenwich Conn. are suppliers of coco amine and tallow amine. Akzo-Nobel sells dodecylamine and Witco Corporation sells oleylamine. BASF Corporation of Mt. Olive, N.J. is a source of hexylamine and octylamine. Nova Molecular Technologies, Inc. of Janesville, Wis. is yet another source of hexylamine. Other fatty amines can be procured through sources such as Aldrich Chemical Company, Milwaukee, Wis.

Tomah Products, Inc., of Milton, Wis. is a well-known supplier of alkyloxypropylamines. Tomah ether amines suitable for use in the invention include: PA-10, PA-12, PA-13, PA-14, PA-16, PA-17, PA-19, PA-1618, PA-2220, PA-1214 and PA-24.

Fillers suitable for use in the invention are available from many commercial sources.

The viscosity of the compositions of this invention may be described as pseudoplastic and thixotropic. Such properties are shown by: the gel strength of the compositions; their relatively high viscosity at low shear rates; their relatively low viscosity at high shear rates; their good uniformity in viscosity reduction in response to uniform shear applied over a period of time; and their good recoverability, that is, recovery of initial properties after shear has ended.

The gel strength contributes to stabilizing the final coating composition against settling over long periods in storage. The high viscosity at low shear rates maintains mix uniformity during processing, packaging and application. The low viscosity at high shear rates makes application easier. And the good recoverability of viscosity minimizes sag and flow after application while solvent evaporation is occurring.

The invention is not limited to roof coating applications. The invention may also be used to coat and provide corrosion resistance to other surfaces such as metal storage containers and automobile underbodies.

PREPARATION OF THE COMPOSITIONS

Preparation of the inventive roof coating composition will vary somewhat depending on the particular constituents to be used in the composition and the type of mixing apparatus available for processing of the constituents. These processing steps are not critical and, while considerable variation is possible, certain blending procedures are preferred.

The inventive surfactant is prepared by admixing the amine with about one molar equivalent of the selected acid although the amount of acid is not absolute and may be varied and remain within the scope of the invention. Blending of the asphalt, clay and surfactant tends to vary based on the processing equipment to be used. In general, if a high-shear mixer is used, the preferred order of addition involves first mixing the asphalt cutback, surfactant, and clay until they are gelled. Then any fillers are added and mixed with the gelled composition. If low-shear equipment, such as a paddle or ribbon mixer, is employed (or if the clay concentration is low in a high-shear mixer batch), the use of a pre-gelling technique is recommended to enhance gelling and optimize dispersion. The preferred pre-gelling process consists of thoroughly mixing all of the surfactant with all of the clay and a portion of the asphalt cutback (preferably about two-thirds) until a thick gel is formed. Then the remainder of the cutback and all of the filler(s) are added and thoroughly mixed. Additional solvent can be added if required after the mix is uniform.

The choice and amount of fillers added in the mix depend in part upon whether the composition is to be a brushable roof coating, a sprayable coating, or a roof cement. The desired final viscosity and texture of the asphalt coating composition can be adjusted by the fillers which are added.

Determining the optimum amount of the inventive surfactant in a coating is critical. The optimum is considered the least amount (that is, the highest C/S ratio) providing the desired gel characteristics and excellent gel stability. The optimum ratio depends primarily on the specific amine and acid precursors selected, the asphalt used, the degree of asphalt oxidation, and the amount of any type of clay used. Therefore, an optimum ratio must be determined for each combination.

One method of determining the optimum C/S ratio is to run a ladder of C/S ratios in a mix of a particular ratio of the chosen clay to the combination of the surfactant and chosen asphalt cutback—for example, 12 parts by weight clay to 88 parts by weight asphalt cutback and surfactant combined.

The C/S ratio may then be varied in 0.5/1 increments (within what is considered an acceptable range), and readings on the gel characteristics of the resulting compositions should be taken at periodic intervals after mixing (such as 24 and 36 hours and several times during a week until a final reading one week after mixing). Temperature and pressure conditions should preferably be controlled during the period of such testing.

The range of ratio increments tested need not be broad, but may start, for example, around 8:1 and extend to perhaps 10:1 or 12:1. Once the optimum C/S ratio is established for a particular asphalt cutback and clay, the same "recipe" can be used with confidence and without further testing to produce coating compositions of this invention made with such cutback and clay at the predetermined C/S ratio.

The instruments and procedures for measuring gel characteristics will not be described here. It is preferred that the recommended ASTM test procedures be used, but any appropriately sensitive test instrument (such as a good penetrometer) and reliable test procedure will be acceptable if properly used.

Large variations in the readings of the gel characteristics over the course of the test period indicate a lack of gel stability. This tends to indicate an unacceptable C/S ratio or some other unacceptable characteristic in the formula. Steady readings are what is desired, provided they show sufficient gel strength.

EXAMPLES OF THE INVENTION

In each of the examples which follow, an asphalt-based coating composition was made using either low-shear or high-shear blending techniques, adding and mixing the listed constituents in the manner described above. For each example the formulation is listed and comments regarding the formulation or the resulting composition are given.

Example 1

| | |
|---|---|
| Trumbull Asphalt Cutback #6009 | 87.00 parts |
| Attagel 36 | 12.00 parts |
| Surfactant (PA-14/neopentanoate) | 1.00 part |

This composition represents a spreadable, gelled mixture suitable for testing the viscosity for the clay/surfactant (C/S) ratio optimization. It includes an oxidized asphalt cutback, an attapulgite clay and a surfactant consisting of a decyloxypropylamine (Tomah PA-14) admixed with 1.0 molar equivalent of pivalic acid (Exxon neopentanoic acid).

Example 2

| | |
|---|---|
| Trumbull Asphalt Cutback #6009 | 87.00 parts |
| Attagel 36 | 12.00 parts |
| Surfactant (PA-14/neopentanoate) | 1.00 part |
| Talc | 21.00 parts |
| Interfibe 231 | 3.00 parts |

This composition represents a marketable roof coating mixture consisting of oxidized asphalt cutback, an attapulgite clay, a surfactant and fillers added for bulk. The surfactant consists of decyloxypropylamine (Tomah's PA-14) admixed with 1.2 molar equivalents of pivalic acid (Exxon neopentanoic acid). This example shows that equimolar amounts of the acid and amine constituents are not required.

Example 3

| | |
|---|---|
| Monsey Asphalt Cutback | 88.80 parts |
| Min-U-Gel AR attapulgite clay | 10.00 parts |
| Surfactant (coco amine/blended acid) | 1.20 parts |
| 325 Mesh Silica | 21.00 parts |

This composition produces gel characteristics consistent with roof coating compositions at lower clay loading. It consists of an industrial-use asphalt cutback, an attapulgite clay, fillers (to supply appropriate bulk) and a surfactant comprised of coco amine admixed with 1.0 molar equivalent of Neo 928 (Exxon blend of Neo Acids).

Example 4

| | |
|---|---|
| Brewer Asphalt Co., AC-30 cutback | 86.00 parts |
| Attagel 36 Attapulgite Clay | 12.00 parts |
| Surfactant (tallow amine/isooctanoic acid) | 2.00 parts |
| Diatomaceous earth | 18.00 parts |
| Interfibe 231 | 3.00 parts |

This composition includes an industrial asphalt cutback, attapulgite clay, fillers (again, to impart bulk) and a surfactant comprised of tallow amine admixed with 1.0 molar equivalent of isooctanoic acid from Exxon.

Example 5

| | |
|---|---|
| Trumbull Asphalt Cutback #6032 | 7.00 parts |
| Attagel 36 Attapulgite clay | 12.00 parts |
| Surfactant (Kemamine T-6502D/ neodecanoic acid) | 2.00 parts |
| 200 Mesh limestone (James River) | 41.00 parts |
| Interfibe 430 (Sullivan Chemical) | 4.00 parts |

This exemplary composition includes an unoxidized asphalt cutback, an attapulgite clay and fillers. The surfactant is a tertiary amine made from a dimethyl cocoamine (Humko Chemical Kemamine T-6502D) admixed with a 1.0 molar equivalent of Exxon neodecanoic acid.

Example 6

| | |
|---|---|
| Trumbull Asphalt Cutback #6009 | 86.50 parts |
| Min-U-Gel G-35 Attapulgite Clay | 12.00 parts |
| Surfactant (PA-2220/blended neo acids) | 1.50 parts |
| Sand | 21.00 parts |
| Ground Slate | 5.00 parts |

This formula consists of an oxidized asphalt cutback, an attapulgite clay and appropriate fillers. The surfactant is comprised of a mix of hexadecyloxypropylamine and octadecyloxypropylamine (Tomah's PA- 2220) admixed with Neo 913 (Exxon blend of neo acids) at 1.0 molar equivalents.

Example 7

| | |
|---|---|
| Trumbull Asphalt Cutback #6009 | 86.50 parts |
| Min-U-Gel G-35 Attapulgite Clay | 12.00 parts |
| Surfactant (DA-14/blended neo acids) | 1.50 parts |
| Sand | 21.00 parts |
| Ground Slate | 5.00 parts |

This formula consists of an oxidized asphalt cutback, an attapulgite clay and appropriate fillers. The surfactant is comprised of a decyloxypropylamino propylamine (Tomah's DA-14) admixed with Neo 913 (Exxon blend of neo acids) at 1.0 molar equivalents.

The compositions of this invention are applied to various surfaces in the same manner as the compositions of the prior art are applied. They are usable as roof coatings, roof cements, vehicle undercoatings, pipe coatings, mastics and adhesives, and for many other purposes.

While the principles of this invention have been described in connection with specific embodiments, it should be understood clearly that these descriptions are made only by way of example and are not intended to limit the scope of the invention.

We claim:

1. In an asphalt roof-coating composition of the type including clay and a surfactant, the improvement comprising:

about 80–95 parts by weight of a roof-coating asphalt cutback;

about 5–20 parts by weight of clay; and a salt surfactant including an amine and a hindered acid, the acid having the general structural formula:

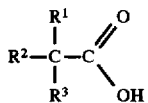

wherein $R^1$ is selected from the group consisting of H and $CH_3$;

$R^2$ is $C_1$–$C_{11}$;

$R^3$ is $C_1$–$C_{11}$; and the total number of carbon atoms in each acid molecule is between 5 and 14; and the amine having the general structural formula:

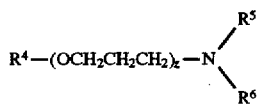

wherein $R^4$ is $C_6$–$C_{20}$;

z is 0 or 1;

$R^5$ is selected from H, $CH_3$ and from 1 to 15 moles of alkoxylated units, such units being selected from the group consisting of ethyleneoxy, propyleneoxy and butyleneoxy and mixtures thereof; and $R^6$ is selected from H, $CH_3$, $R^4$—$(OCH_2CH_2CH_2)_z$—, and $C_6$–$C_{20}$.

2. The composition of claim 1 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

3. The composition of claim 2 wherein the acid is neopentanoic acid.

4. In an asphalt roof-coating composition of the type including clay and a surfactant, the improvement comprising:

about 80–95 parts by weight of a roof-coating asphalt cutback;

about 5–20 parts by weight of clay; and a salt surfactant including an amine and a hindered acid, the acid having the general structural formula:

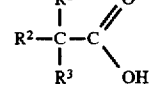

wherein $R^1$ is selected from H and $CH_3$;

$R^2$ is $C_1$–$C_{11}$;

$R^3$ is $C_1$–$C_{11}$; and the total number of carbon atoms in each acid molecule is between 5 and 14; and the amine having the general structural formula:

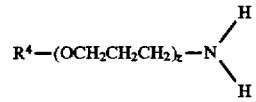

wherein $R^4$ is $C_6$–$C_{20}$; and z is 0 or 1.

5. The composition of claim 4 wherein the primary amine is selected from the group consisting of coco amine and tallow amine.

6. The composition of claim 5 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

7. The composition of claim 6 wherein the acid is neopentanoic acid.

8. The composition of claim 5 wherein the primary amine is selected from the group consisting of hexylamine, octylamine, decylamine, dodecylamine, tetradecylamine, oleylamine, sterylamine, linoleylamine, linolenylamine, palmityleylamine, palmitylamine and mixtures thereof.

9. The composition of claim 8 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

10. The composition of claim 9 wherein the acid is neopentanoic acid.

11. The composition of claim 4 wherein the amine is an alkyloxypropylamine.

12. The composition of claim 11 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

13. The composition of claim 12 wherein the acid is neopentanoic acid.

14. The composition of claim 11 wherein the alkyloxypropylamine is selected from the group consisting of octyloxypropylamine, decyloxypropylamine, dodecyloxypropylamine, tetradecyloxypropylamine, hexadecyloxypropylamine, octadecyloxypropylamine and mixtures thereof.

15. The composition of claim 14 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

16. The composition of claim 15 wherein the acid is neopentanoic acid.

17. The composition of claim 14 wherein the amine is decyloxypropylamine.

18. The composition of claim 17 wherein the acid is selected from the group consisting of 2-methylbutanoic acid, neopentanoic acid, 2-methylhexanoic acid, neoheptanoic acid, isooctanoic acid, neooctanoic acid, isononanoic acid, neononanoic acid, isodecanoic acid, neodecanoic acid, neotridecanoic acid and mixtures thereof.

19. The composition of claim 18 wherein the acid is neopentanoic acid.

* * * * *